US008412628B2

(12) United States Patent
Beach et al.

(10) Patent No.: US 8,412,628 B2
(45) Date of Patent: Apr. 2, 2013

(54) SYSTEM AND METHOD FOR LEGAL DOCUMENT AUTHORING AND ELECTRONIC COURT FILING

(75) Inventors: Michael J. Beach, Grosse Pointe Park, MI (US); Darin B. Herring, Northville, MI (US); Subra Sundaramurthy, Canton, MI (US); Ambrish Sundaram, Farmington Hills, MI (US); Shawn J. Thomas, Northville, MI (US)

(73) Assignee: Asset Acceptance, LLC, Warren, MI (US)

( * ) Notice: Subject to any disclaimer, the term of this patent is extended or adjusted under 35 U.S.C. 154(b) by 107 days.

(21) Appl. No.: 12/767,296

(22) Filed: Apr. 26, 2010

(65) Prior Publication Data

US 2010/0274715 A1    Oct. 28, 2010

Related U.S. Application Data

(60) Provisional application No. 61/173,019, filed on Apr. 27, 2009.

(51) Int. Cl.
*G06Q 40/00* (2012.01)

(52) U.S. Cl. ............... 705/40; 705/35; 705/37; 705/1.1; 705/26.1

(58) Field of Classification Search ............... 705/1.1, 705/40, 37, 34, 35, 26.1, 80, 14.52; 709/203, 709/219, 206; 713/182, 168
See application file for complete search history.

(56) References Cited

U.S. PATENT DOCUMENTS

| | | | |
|---|---|---|---|
| 5,572,643 A | 11/1996 | Judson | |
| 5,737,619 A | 4/1998 | Judson | |
| 6,098,070 A | 8/2000 | Maxwell | |
| 6,185,586 B1 | 2/2001 | Judson | |
| 6,430,581 B1 | 8/2002 | Mahoney et al. | |
| 6,457,025 B2 | 9/2002 | Judson | |
| 7,043,489 B1 | 5/2006 | Kelley | |
| 7,162,428 B1 | 1/2007 | Rosenthal et al. | |
| 7,689,923 B2 | 3/2010 | Massasso et al. | |
| 2002/0002469 A1 | 1/2002 | Hillstrom | |
| 2002/0062262 A1 | 5/2002 | Vasconi et al. | |
| 2003/0028477 A1 | 2/2003 | Stevenson et al. | |
| 2003/0028782 A1* | 2/2003 | Grundfest ..................... 713/182 |
| 2003/0187826 A1 | 10/2003 | Kennedy et al. | |
| 2004/0128623 A1 | 7/2004 | Hudson | |
| 2005/0086179 A1 | 4/2005 | Mehmet | |

(Continued)

OTHER PUBLICATIONS

OASIS, NPL—"Electronic Court Filing 4.0 Web Services Service Interaction Profile Version 2.0" Sep. 21, 2008.*

(Continued)

*Primary Examiner* — John H Holly
(74) *Attorney, Agent, or Firm* — Dykema Gossett PLLC (57) ABSTRACT

A system for legal document authoring for a legal action and electronic court filing of such legal documents provides an online network for subscribers. The system provides a direct mechanism (and a web portal mechanism) for submitting a claim file containing party and claim information necessary for automatic legal document generation based on an auto-selected destination court (in some embodiments) and further based on at least certain party and claim information. The automatically-generated legal documents are compliant with the requirements of the destination court, providing end-to-end automation for improved efficiency in judicial debt collection. The system also provides an online network for facilitating communications between subscribers (litigants) and the court systems.

28 Claims, 4 Drawing Sheets

U.S. PATENT DOCUMENTS

| | | | |
|---|---|---|---|
| 2005/0240578 | A1 | 10/2005 | Biederman, Sr. et al. |
| 2006/0129445 | A1 | 6/2006 | McCallum, Jr. |
| 2007/0005637 | A1 | 1/2007 | Juliano et al. |
| 2007/0055532 | A1 | 3/2007 | Jneid |
| 2007/0112584 | A1* | 5/2007 | Rosenthal et al. ............ 705/1 |
| 2007/0136184 | A1 | 6/2007 | Goodman et al. |
| 2008/0120606 | A1 | 5/2008 | Stanley et al. |
| 2009/0030754 | A1 | 1/2009 | McNamar |
| 2009/0083328 | A1 | 3/2009 | Vivona et al. |
| 2009/0119191 | A1 | 5/2009 | Stuart et al. |
| 2009/0150168 | A1 | 6/2009 | Schmidt |
| 2009/0193210 | A1 | 7/2009 | Hewett et al. |

OTHER PUBLICATIONS

OASIS Electronic Court Filing Version 4.0, Committee Draft 01, Sep. 21, 2008.

OASIS Electronic Court Filing 4.0 Web Services Service Interaction Profile Version 2.0, Committee Draft 01, Sep. 21, 2008.

OASIS LegalXML Brochure.

OASIS Quick Start Guide.

OASIS eContracts Version 1.0, Committee Specification, Apr. 27, 2007.

OASIS Electronic Court Filing 4.0 Portable Media Service Interaction Profile Version 2.0, Committee Draft 01, Sep. 21, 2008.

PACER Brochure.

Tao et al., Connecting XML-Based E-Commerce to the Electronic Litigation Systems, Aug. 15, 2000.

UML Tutorial.

Han et al., Interoperability from Electronic Commerce to Litigation Using XML Rules, Int J Law Info Tech (2007) 15(3): 233-252 first published online Dec. 8, 2006 doi:10.1093/ijlit/eal013.

Commercial Legal Software, Collection-Master, http://www.collectionsoftware.com/cmaster/list.htm, Jan. 19, 2010.

COGENT Intelligent Collections, http://www.bsi-idea.com/cogent.asp, Jan. 19, 2010.

Convoke Systems, Our Solutions, http://www.convokesystems.com/html/our_solutions.html, Jan. 19, 2010.

DCLS PLUS Premium Debt Collection Software with ZEUS Litigator, http://www.dclsplus.net, Jan. 19, 2010.

Encore Capital Group, Inc., http://www.encorecapitalgroup.com/about/philosophy.htm, Jan. 19, 2010.

Hubbard Systems, Inc. Debt Collection Software, Colipso, http://www.hubbardsystems.com/colipsohome.html, Jan. 19, 2010.

Covisint—Services—Portal & Collaboration Services, http://www.covisint.com/services/portal, Jan. 19, 2010.

TSYS, White Papers, http://www.tsys.com/thoughLeadership/Whitepapers/index.cfm, Jan. 19, 2010.

Ontario Systems, http://www.ontariosystems.com/index.php/ar_management/collection-agencies, Jan. 19, 2010.

CollectMax from JST, http://collect-max.com/index.php/collectmax/features, Jan. 19, 2010.

* cited by examiner

SYSTEM AND METHOD FOR LEGAL DOCUMENT AUTHORING AND ELECTRONIC COURT FILING

CROSS-REFERENCE TO RELATED APPLICATIONS

This application claims the benefit of U.S. Provisional Patent Application Ser. No. 61/173,019 filed Apr. 27, 2009 entitled "A SYSTEM FOR PROVIDING COMMUNICATION AND CONNECTIVITY BETWEEN LITIGANTS AND COURT SYSTEMS", hereby incorporated by reference in its entirety.

TECHNICAL FIELD

The present invention relates generally to electronic document generation and filing systems and more particularly to systems and methods for legal document authoring and electronic court filing (ECF).

BACKGROUND OF THE INVENTION

Many entities extend credit (i.e., credit issuers) to consumers, for example, credit card companies, utilities, banks and other financial service companies for a wide variety of purposes, including first and second mortgages, general consumer credit, home improvement loans, student loans, home equity, automobile purchase loans and the like. When consumers default on such loans, credit issuers are often faced with either trying to collect the debt or charging it off. Businesses have arisen whose primary purpose is to purchase such defaulted debts from the credit issuers and taking over the collection of the debt through legally compliant debt collection practices. These companies are known as debt buyers.

Debt buyers often incur significant pursuit costs to collect on the debt. While there are various known debt collection approaches, one particularly effective, albeit up to today costly, approach involves collecting such debts judicially. The typical judicial model involves filing claims (i.e., to collect on the defaulted debt) in state courts across the United States. However, this approach involves significant costs, due to the fact that each state/court has its own unique set of filing requirements, forms, preferences and the like that make it difficult and highly inefficient for all entities involved, particularly high volume debt buyers (and their legal counsel). Simply stated, document flow in the above scenario is inefficient.

It is known to electronically file a manually prepared legal document in an electronic format, such as in an Adobe Acrobat portable document format (pdf). For example, U.S. Patent No. 2007/0055532 entitled COURT ELECTRONIC FILING SYSTEM to Jneid disclose a system and method for electronically filing a court paper; however, the system with which the user interacts is limited to attaching documents, exhibits and the like that have already been prepared. This approach, while perhaps providing a minor improvement over manual preparation of legal documents followed by physical transport and filing of paper legal documents with the court, does not address the end-to-end inefficiency described above (i.e., from a defaulted loan or the like through the judicial filing of a claim).

More sophisticated approaches have been developed, for example, as seen by reference to a suite of LegalXML standards, now in version 4.0, defining standards for legal data exchange. For example, an Electronic Court Filing (ECF) 4.0 portion of LegalXML allows one to standardize integration methods in e-filing implementations using XML (extensible markup language) and thus provides some direction as to authoring and filing of electronic documents with a court. While this development represents an improvement compared to electronically filing portable document format (pdf) files, the end-to-end inefficiencies referred to above remain.

There is therefore a need for a system and method for legal documents authoring and electronic filing that minimizes and/or eliminates one or more of the problems set forth above.

SUMMARY OF THE INVENTION

One advantage of the system and methods described, depicted and claimed herein relates to significantly improving the end-to-end efficiency in the judicial debt collection process, i.e., in converting claim and party information relating to a legal claim (e.g., a debt collection claim) into the appropriate legal documents that are in compliance with the requirements established by a specific destination court. In certain embodiments, systems and methods are provided where the submission of a claim file containing party and claim information, the selection of the destination court and the authoring and electronic filing of the required legal documents are all automated.

A method for authoring and electronically filing a legal document, for example to institute a legal action in an appropriate court includes a number of steps. The first step includes obtaining a claim file. In preferred embodiments, the claim file contains a party information portion and a claim information portion, and which may be obtained from a system subscriber (e.g., a debt buyer/plaintiff) through either a direct interface integrated with the subscriber's back office litigation support computer systems or through a web portal interface. The next step involves selecting a court in which the legal documents to be produced will be filed based, at least in part, on information included in the claim file. In a preferred embodiment, the selecting step involves the use of business rules that facilitate evaluation of the information contained in the claim file. The next step involves generating at least one legal document, in electronic form, configured for electronic filing in the selected court, using the information in the claim file as well as predetermined data associated with the selected court. In an embodiment, the predetermined data may include forms and other legal documents required or preferred by the selected destination court, which may be populated with at least some of the information contained in the claim file. The legal documents thus produced are in compliance with the requirements and/or preferences of the selected court. Finally, the last step of the method involves electronically delivering (filing) the generated legal documents to the selected court. Other aspects of the method involve electronically facilitating settlement of the court filing fees, as well as providing a platform for subscribers to obtain status updates on the progress of the litigation (i.e., in which the legal documents were filed). Through the foregoing, end-to-end efficiency is significantly improved, thereby reducing the cost burden incurred in judicially collecting on a debt.

In other embodiments, for subscribers (litigants) without adequate support infrastructure, a suite of value-added application services are provided. In addition, a method to facilitate communications (e.g., messaging) among and between subscribers and the court systems is also presented.

A corresponding system is also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
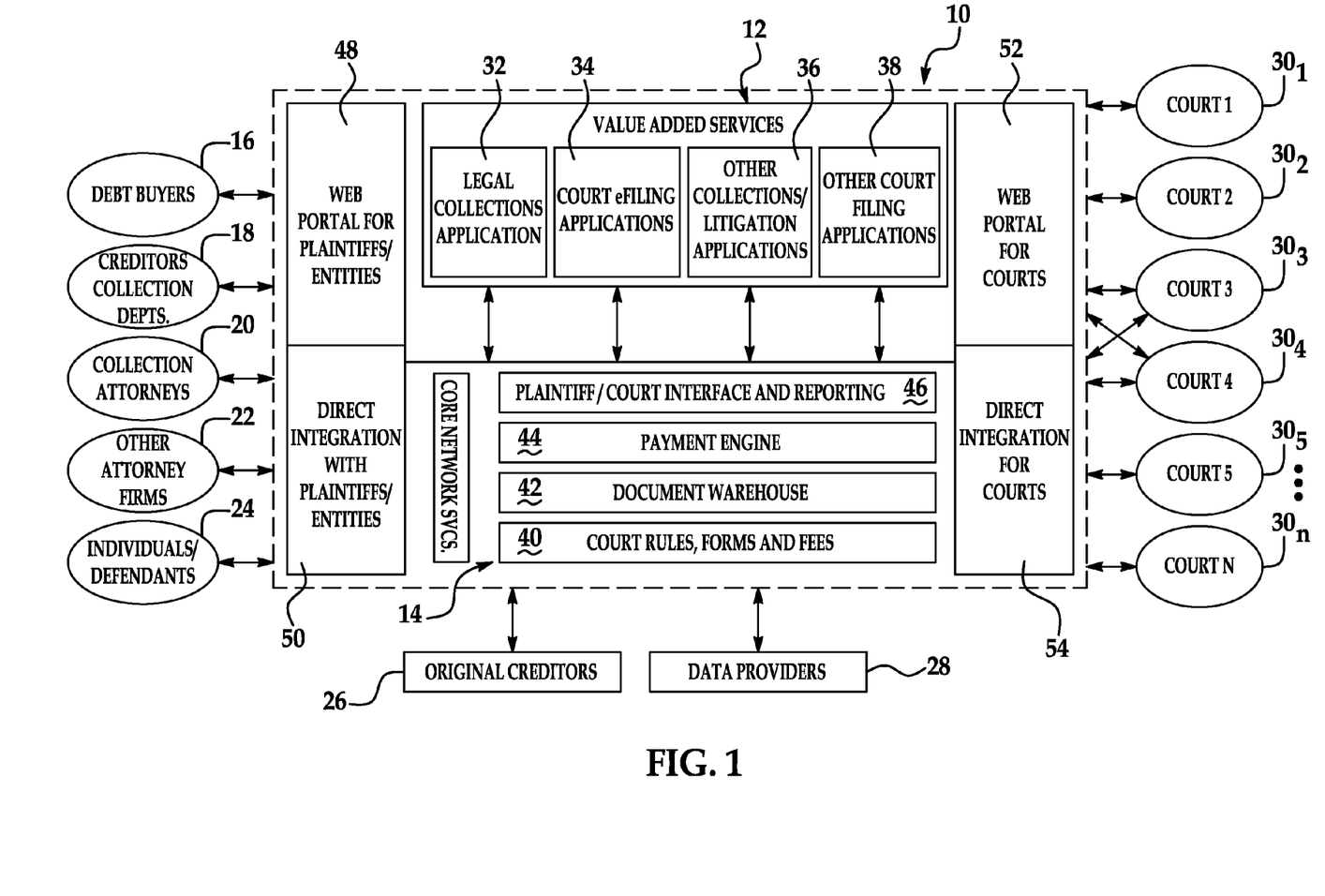
FIG. 1 is a simplified diagrammatic and block diagram of an embodiment of a system for authoring and electronically filing legal documents.

Referring now to the drawings wherein like reference numerals are used to identify identical components in the various views, FIG. 1 is a diagrammatic and block diagram of a system 10. The system 10 is configured to provide, to a wide range of entities, a plurality of value-added service applications 12 that pertain, without loss of generality, to debt collection activities, along with a plurality of core network service applications 14 for supporting the value-added service applications 12. The system 10 automates many aspects of debt collection via the judicial process, thereby significantly improving end-to-end efficiency. In addition, the system 10 (sometimes also referred to as the host computer) is configured to provide rich functionality to facilitate communications among and between various subscribers (e.g., litigants) and the court systems.

The entities who may interact with the system 10 include, for example only, debt buyers 16, creditor's collection departments 18, collection attorneys 20, other attorney firms 22, individuals 24 (e.g., defendant/debtor) as well as original creditors 26 and data providers 28. As to data providers, these entities may securely provide electronic documents to system 10 or may alternatively provide various secure services, for example only, data/document warehousing services (in support of core network services), skip tracing services (in support of value-added services) and the like, as described in greater detail below. The system 10 is configured to provide an online network that connects the various entities mentioned above that interact with a plurality of different courts, designated in FIG. 1 as courts $30_1, 30_2, 30_3, 30_4, 30_5, \ldots, 30_n$. The system 10 enables the efficient filing and management of documents and claims. As will be described in greater detail below, the system 10 is configured to allow the entities to transact and consummate litigation activities.

Given the varied nature of entities that may use the system 10, the system 10 is configured to provide access control and security measures, for example by using conventional hardware and software approaches, in order to restrict access to system 10 and the information contained therein and/or to restrict actions capable through the use of the system 10. In this regard, in an embodiment, an unaffiliated individual, an individual associated with an entity (i.e., an individual attorney in the group 20 of collection attorneys) or an entity (i.e., a back-office server that automatically connects with system 10) must first become a subscriber to system 10, and then they are issued credentials (e.g., user identification and password). The system 10 may include an authentication block configured to verify a subscriber's credentials prior to permitting access or authority to perform actions. Moreover, the system 10 may be further configured with a hierarchy of access such that some authenticated subscribers may only be permitted view access while other authenticated subscribers may be permitted an enlarged set of rights, for example, to submit a claim file to the system 10 and/or to electronically file a generated legal document in a selected court. Additionally, security may be enforced using conventional authentication (i.e., as described above) and/or encryption of communication sessions, as known generally in the art. In an embodiment, it should be understood that a subscriber must first authenticate to the system 10 before the system 10 will allow any of the functions described herein. In an alternate embodiment, however, at least some portion of the functionality of the system 10 may be provided to unauthenticated guests.

Referring again to FIG. 1, the integrated set of value-added service applications 12 are configured to provide functions that allow particular interaction with the various courts $30_1, 30_2, 30_3, 30_4, 30_5, \ldots, 30_n$ and includes a legal collections application block 32, an electronic court filing (ECF) application block 34, an other collections/litigation application block 36 and an other court filing application block 38. The set of core network service applications 14 are configured to support the basic operation of the online network established by system 10 and includes a business rules engine 40, an electronic data and document warehouse block 42, an electronic payment engine 44, and a plaintiff/Court interface and reporting block 46. Finally, system 10 further includes multiple communication interfaces, including a subscriber-side web portal 48, a subscriber-side direct interface 50, a court web portal 52 and a court direct interface 54. These items will all be described in greater detail below.

Before proceeding to a detailed description of the embodiments, however, a overview of the flow and operation of the system 10 will be set forth. As described in the Background, high volume debt buyers 16 using conventional approaches sustain a significant cost to judicially collect on a debt. This is due to the high cost involved in preparing and filing disparate legal documents needed to meet the disparate court requirements in the various jurisdictions. The debt buyers 16 purchase "debt" from original creditors (or credit issuers) 26, for example, when the consumer has defaulted on a payment obligation. The debt buyer 16 typically maintains records of these purchased debts in electronic form.

Subscribers to the system 10, such as the debt buyer 16, may submit a so-called claim file to the system 10. The claim file includes a party information portion (e.g., plaintiff and defendant/debtor names and addresses) as well as a claim information portion (e.g., account number, debt type, principal and interest balances, last payment date, etc.). The claim file may have supporting document(s) associated therewith (e.g., copies of account statement, credit application, etc.). The system 10 selects, using business rules, an appropriate court (the "selected court") in which to file the claim (i.e., the produced legal documents, for example, complaint). Based on the selected court, the system 10 generates the needed legal documents automatically from the claim file, in compliance with the requirements of the selected court. The system 10 will further electronically file the generated legal documents and make available the filing acknowledgement and other information regarding the newly-instituted case (e.g., case number, assigned judge, etc.). Through the foregoing, high volume litigation may be pursued efficiently and effectively.

With continued reference to FIG. 1, the set of value added service applications 12, generally, constitute add-on services that subscribers to the system 10 may choose to utilize, for example, based on their own internal capabilities. In other words, the value-added service applications 12 may be useful for those litigators that do not have robust internal technical capabilities. In one embodiment, the value-added services may be provided, economically speaking, in accordance with a software-as-a service model.

The legal collections application 32 is configured to author (i.e., generate) legal documents (e.g., pleadings) in an electronic form, using a submitted claim file, and formatted for electronic filing in a selected one of the courts $30_1, 30_2, 30_3, 30_4, 30_5, \ldots, 30_n$. The generated legal documents are configured to meet all the specific filing requirements of the selected court (including content and form). The legal collection application block 32, in an embodiment, is configured to prepare such legal documents by populating forms and other base documents selected from the electronic data and document warehouse 42 according to pre-programmed business rules defined in rules block 40.

For example only, courts may require (or at least permit) that electronically filed documents be formatted in accordance with different standards, such as various extensible markup language (XML) schemas such as LegalXML e.g., LegalXML 3.0 or 4.0, 2GEFS (i.e., $2^{nd}$ Generation Electronic Filing Specification), or GJXDM (i.e., Global Justice XML Data Model), as seen by reference to U.S. Patent Publication 2008/0120606 A1 entitled UNIVERSAL XML TRANSLATOR to Stanley et al., hereby incorporated by reference in its entirety. As a transitional embodiment for courts that do not have advanced direct electronic filing capabilities, the legal collections application 32 is configured to generate alternative, acceptable documents, such as Acrobat format (pdf) files. As a further embodiment, a court application (not shown) suitable for interaction with system 10 may be provided. In the latter case, the court application would be configured so as to be compatible with the format implemented in legal collections applications 32.

The electronic court filing (i.e., court E-Filing) application 34 is configured to facilitate the electronic filing (i.e., electronic transfer) of legal documents generated by application 32 to a selected one of the courts $30_1, 30_2, 30_3, 30_4, 30_5, \ldots, 30_n$. The ECF application 34 is further configured to receive at least one, and preferably multiple, items of information from the selected court as a result of the filing of the generated legal document. For example, such items of information may be any one or more of the following items, including but not limited to: a filing acknowledgement, a case identification number, an identification of an assigned judge or a hearing date. The block 34 is further configured to store the returned items in a history database for later use, for example, for later retrieval by an authenticated user of the system 10.

The other collections/litigation applications block 36 is configured to support and/or directly provide a variety of other collection and/or litigation-related services. For example, such other services may include a letter and form management function, a printing and distribution service; a skip tracing service (i.e., a process for providing information to help locate a person's whereabouts); other information acquisition services; or a data scrubbing service (i.e., including credit scoring and activity, address validation cleansing, phone number validation and cleansing, legal scoring, bankruptcy notifications, bank verifications and property notifications). These services may be useful, even in pre-filing investigation activities. The foregoing list is exemplary only and not limiting in nature. The other court filing applications block 38 is configured to support niche court filings, such as probate and bankruptcy filings.

Figure 2:
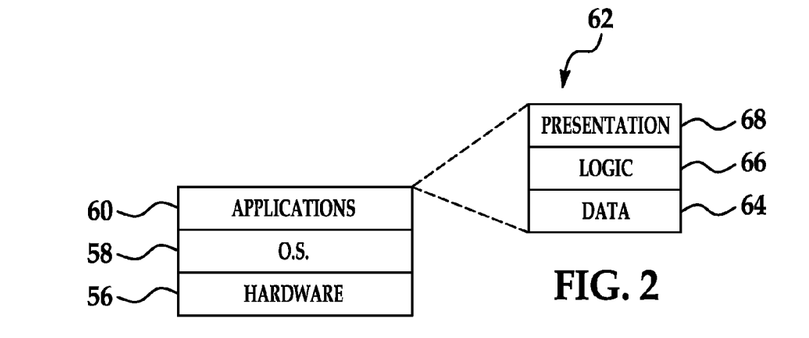
FIG. 2 is block diagram of an n-tier paradigm suitable for implementing various applications of the system of FIG. 1.
Figure 3A:
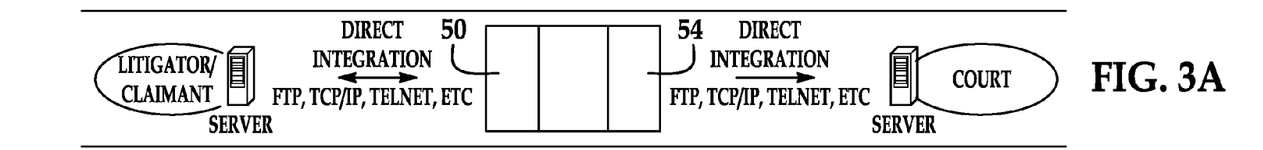
FIGS. 3A-3D are simplified diagrammatic and block diagrams showing direct integration and web portal interfaces for system subscribers and for the courts.
Figure 3B:
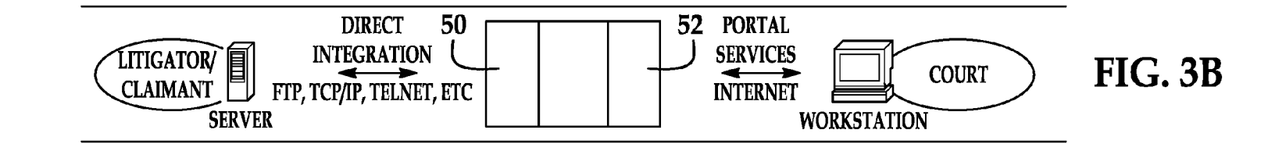
Figure 3C:
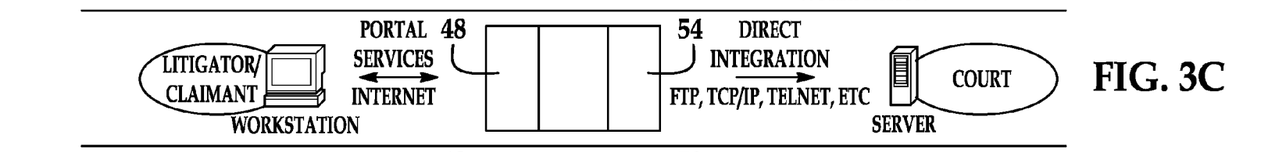
Figure 3D:
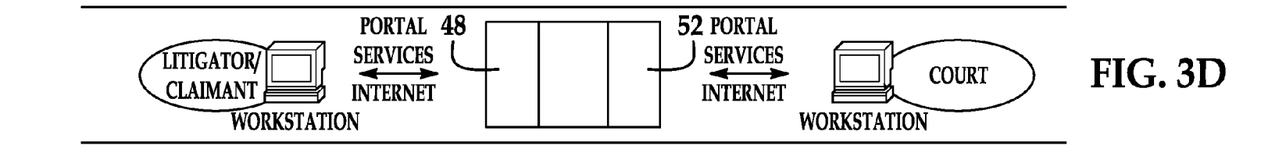

FIG. 2 is a simplified block diagram of an implementation paradigm suitable for use in embodiments of the invention. In particular, the application blocks 32-38 and 48-52 may be implemented using conventional hardware 56 and operating systems 58 known in the art. The hardware 56 may include commercially available desktop computers, notebook computers, server computers, personal digital assistants (PDA's) as well as mobile computing and communications devices. These computing devices include conventional processing capabilities as well as memory storage (e.g. random access memory (RAM), read-only memory (ROM), etc). Conventional operating systems 58 may be employed, such as variants of the Windows operating system (e.g., Windows 7, Windows Vista, etc.), Macintosh OS X, Linux as well as other conventional operating systems found on mobile devices, for example. The application blocks 32-38 and 48-52, designated generally as application 60 in FIG. 2, may comprise an n-tier paradigm 62 including a data tier 64, a business (logic) tier 66 and a presentation (user interface) tier 68, as more specifically described herein. As known, generally, the presentation tier 68 is the top most level configured for interaction with the user, and may present both queries to the user as well as present information to the user. The business (logic) tier 66 implements the business logic and processes (as also described herein). The data tier 64 provides the function of data storage and retrieval, for example, by way of database or other data storage structures. Other paradigms are known, however, and the foregoing is exemplary only and not limiting in nature.

FIGS. 3A-3D are simplified diagrammatic and block diagrams showing access scenarios involving both web portal and direct integration interfaces. The system 10 provides access for the various entities described above in two particular ways. In a first embodiment, the system 10 provides a direct interface (e.g. direct integration interfaces 50 and 54) suitable for connection to an entity's back-office systems. For example, use of such an interface 50 by a subscriber (e.g., debt buyer) may support relatively high volume transfer of claim files and other information directly into system 10 without human intervention and further receive updates from system 10 regarding case status and the like. In the case of a court, the direct interface 54 is configured to support the direct (i.e., without human) transfer of legal documents electronically. In a second embodiment, the system 10 provides a human-centric portal, such as a web portal accessed through the Internet (e.g., web portal interfaces 48 and 52), configured to allow a subscriber to interact with the system 10. The web portal embodiment is particularly suited for reduced volume entities or those without technical capabilities for direct integration with system 10 via interfaces 50, 54. For example, courts in rural areas may not have sufficient volume to warrant direct integration and thus may use web interface 52 to access system 10, for example, as a source of legal documents (e.g., retrieve and print out legal documents). In an embodiment, subscriber's may "file" legal documents which deposits such documents on system 10, awaiting retrieval (and optionally print out) by the destination court. Thus, while the term electronic filing with the courts preferably refers to the use by the system 10 of the direct integration interface 54 with the courts $30_1, 30_2, 30_3, 30_4, 30_5, \ldots, 30_n$, for transferring electronic documents, electronic filing is also meant to refer to the above process of storing electronic documents on system 10 for retrieval and printing by the courts. This latter form of electronic filing, more in the nature of "pull" model of information transfer, still represents an improvement over conventional generation of paper documents coupled with physically carrying such documents to the courthouse for filing.

The direct integration interfaces may be compliant with conventional communications protocols, such as the file transfer protocol (FTP), TCP/IP, Telnet among others. It should be understood that end-to-end connectivity between an entity's back-office system and the direct integration interface 50 (or interface 54 in the case of a court) may involve conventional communications apparatus, such as hubs, routers, bridges, gateways, firewalls, switches, remote access devices and the like Likewise, the web portal interfaces are configured to be accessed by a subscriber over the world wide web (WWW) portion of the Internet, using well established communications protocols, such as hypertext transfer protocol (http), secure http (https) and the like. In this regard, it is contemplated that the web portal portions of system 10, namely portals 48, 52 will include web server functionality configured to interact with conventional client-side web browser application programs executing on subscribers' computing devices.

In an embodiment, the direct integration interface 50 is configured to receive a wide range of file types and formats. Accordingly, in the case where a subscriber's (i.e., plaintiff's) internal litigation system (i.e., an internal litigation software application which is used to prepare accounts for litigation) is connected to system 10 via the direct integration interface 50, claim files in the plaintiff's native format may be nonetheless communicated to the system 10. The system 10 (e.g., as either part of interface 50 or as a separate core service included within block 14) may include a mapping module (not shown) that translates and/or maps data contained in the native claim file into a claim file format understood and usable by the various applications within system 10. For example only, such a mapping module may be configured to map each source data element to a corresponding, specific destination data element (e.g., a "SSN" field in the source file may be mapped to a corresponding "Social Security Number" field in the destination file, or alternatively, a last payment date of "12/13/09" in the source file may be mapped to "12/13/2009" in the destination file, etc.). Additionally, in a preferred embodiment, the system 10 is configured to use LegalXML as its native claim information (claim file) format, and accordingly, claim data originating from a subscriber's back-office system may need to be converted by the mapping module from that source system's native file format into an XML format, specifically a LegalXML compliant file format. Alternatively, in the case where a plaintiff does not have a direct connection to system 10, the web portal interface 48 may be used, which employs a user interface configured to solicit the needed information and produce a claim file in the desired format for internal use by the applications of system 10 (i.e., note that the web portal interface, in an embodiment, is a value-added service of system 10).

With continued reference to FIG. 1, the business rules engine 40 is configured to automatically facilitate selection of a court, needed or desired pleadings and determine other court filing requirements. In an embodiment, the business rules sought to be enforced by system 10 may be embedded in the software used to implement the rules engine 40. Generally, business rules are typically the best practices of an organization learned and honed over a period of time. Business rules may also include, pertinent regulations or even guidelines that are extracted from applicable official publications. Whatever the source, such rules essentially establish a set of conditions and associated actions that are to be complied with during operation of system 10.

For example, system 10 may include a business rule for selecting a court in which to file legal documents constituting a claim. Such a business rule might specify that the selection of the particular court (i.e., from the plurality of candidate courts $30_1, 30_2, 30_3, 30_4, 30_5, \ldots, 30_n$) will be based on (i) the jurisdiction (i.e., state) of the debtor and (ii) the amount of indebtedness. A further business rule might specify that once a court has been selected, a corresponding set of legal document forms will be identified as being required for filing. A still further business rule might specify that for a particular legal document for a selected court (e.g., a Complaint document), that a corresponding court filing fee will be necessary for the electronic filing of that legal document.

In one embodiment, the business rules may be embedded at different layers of the software described herein for system 10. For example, conditions imposed by a business rule may be embedded as a set of database attribute values while actions (i.e., resulting from satisfaction of one of the conditions) may be embedded as database procedures. When the rules engine 40 encounters data (e.g., in the claim file) that matches a predetermined (i.e., stored) condition, then the engine 40 invokes the corresponding database procedure recall in FIG. 2 that the logic (business rules) tier 66 and the adjacent data tier 64 interact in accordance with the embedded rules. In a further embodiment, the rules engine 40 is preferably architected to be dynamically configurable without the need for installing a new software patch or shutting down the system 10 (in whole or in part). In this preferred embodiment, dynamic configurability is accomplished, in part, through use of table-driven configuration rules than can be modified as needed, for example, to maintain alignment with changes that may occur in specific court requirements. Of course, any other changes that may occur in the business rules may also be implemented in the same manner described above.

In addition, the rules engine automatically triggers appropriate work flows, such as escalation of approvals based on dollar amounts, alternate approval paths based on type of litigation, and the like. To elaborate, system 10 may provide, in an embodiment, the capability of allowing one person, such as a paralegal or the like, to enter claim information, for example through web portal 48. Then depending upon predetermined criteria (e.g., dollar amounts involved in the claim or other criteria), the claim, based on the entered claim information, will be routed to a second person, such as a responsible attorney, for review and authorization for court filing. System 10 is configured to automatically implement specified work flows customized to particular entities, which are value added services for those entities (e.g., low volume debt buyers) who may not have a high enough volume to warrant direct integration with system 10. It should be understood that entities having direct integration capabilities will typically pre-approve claims for court filing, and thus may not require some of the advanced work flow features of system 10. In an embodiment, the above-mentioned work flows may be implemented in accordance with business rules (implemented in the business rules engine 40) specified for and associated with specific user login credentials.

The electronic data and document warehouse 42 is configured to store a variety of information used by the system 10. As to electronic data, block 42 may be configured to store operational data, for example, claim files imported into system 10 as described above.

Figure 4:
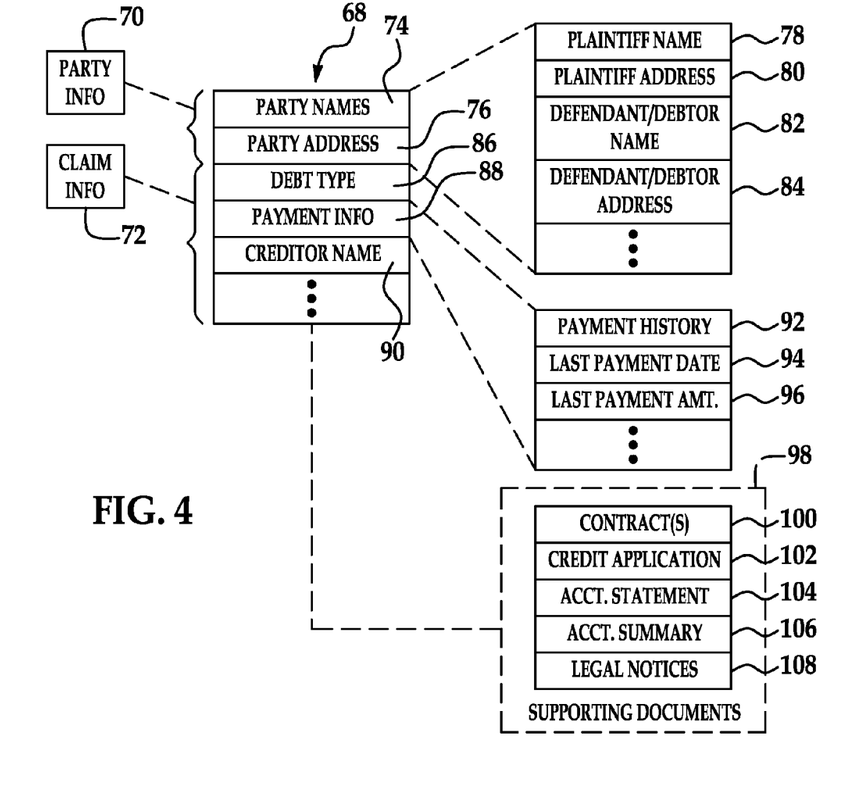
FIG. 4 is block diagram showing, in greater detail, an exemplary claim file.

In this regard, FIG. 4 shows a simplified and exemplary claim file 68 of the type that may be stored by or in warehouse 42. Claim file 68 may include, generally, a party information portion (designated generally at 70) as well as a claim information portion (designated generally at 72). As to the party information portion 70, the claim file 68 may include fields corresponding to at least party names 74 and party addresses 76. As shown in the adjacent exploded block in FIG. 4, the party names and addresses may in turn specifically include a plaintiff name 78, a plaintiff address 80, a defendant/debtor name 82 and a defendant/debtor address 84. Of course, the identity of the plaintiff may not be the original creditor (credit issuer) and may in fact be a debt buyer who by assignment holds the right to collect on the debt. The party information portion 70 may include still further pieces of information, as known to those of ordinary skill in the art.

The claim information portion 72 may include fields corresponding to pieces of information associated with a debt upon which a claim may be filed with a court. For example only, the claim information portion of the claim file 68 may include a debt type 86 (e.g., credit card, auto loan, etc.), payment information 88 and an original creditor name 90, to list a few. As show in the adjacent exploded block in FIG. 4, the payment information field 88 may in turn specifically include a payment history parameter 92, a last payment date 94 and a last payment amount 96. It should be understood that the foregoing is both simplified and exemplary only, and not limiting in nature.

Moreover, the claim file 68 may have associated therewith one or more supporting documents needed or desirable to support a legal claim to collect on a debt, such supporting documents being designated generally by reference numeral 98. For example, supporting documents may include a contract 100 (e.g., loan contract on which a debt was incurred), a credit application 102, an account statement 104, an account summary 106 and one or more legal notices 108 (e.g., notice of default of an obligation). The supporting document(s) 98 may be submitted by the subscriber with the claim file to the system 10, or may be added after the claim file has been submitted but prior to generation/filing of the legal document, or some combination of both approaches.

The electronic data and document warehouse 42 may additionally include common forms and legal documents required by the courts and specific documents required to support the interaction of the users with the courts via system 10, such as a summons, a complaint and post-judgment pleadings (e.g., garnishments, executions, liens and the like). It should be understood that the forms and base legal documents included in the warehouse 42 have adequate identifying information so that they can be associated with a specific court. In other words, each of the forms/documents contained in the warehouse 42 will have either a direct association with a specific court or courts or alternatively have an identification, which, through other logic (i.e., business rules) can be identified as the forms/documents to be used for a particular court.

The warehouse 42 is further configured to detect any changes to approved versions of key legal reference documents and automatically alert subscribers to such changes. The warehouse 42 may be implemented using conventional hardware and software, and in one embodiment, may be part of an n-tier model (best shown in FIG. 2—data tier 64).

The payment engine 44 is configured to facilitate settlement of court fees through various conventional electronic payment methods, for example only, through automatic clearing house (ACH) compliant methods, which, as known, may involve the use of an electronic funds transfer network that enables financial institutions to distribute electronic credit/debit entries to bank accounts and to settle such entries. Payment engine may also allow use of a credit card to settle fees. As a further alternative, the payment engine 44 may employ a settlement approach operated by system 10. These are exemplary only. For example, U.S. Patent Publication 2007/0055532 A1 entitled COURT ELECTRONIC FILING SYSTEM to Jneig, the specification of which is hereby incorporated by reference in its entirety, discloses a system and method for electronically filing a court paper, in which settlement of court fees may be made through a new account using a credit card, a new account using checking and an existing EFS account.

In operation, the payment engine 44 is configured to electronically trigger payments based on transaction completion rules using automatic workflows for obtaining necessary authorizations. The payment engine 44 provides the ability for litigants and claimants to settle their court fees directly through system 10. Any specific fee generated by system 10 is based on the specific requirements of a selected court in which a legal document is filed.

The plaintiff/court interface and reporting block 46 is configured to facilitate subscriber access (i.e., an entity such as a plaintiff and/or a court) to case history (or status) information regarding filed cases. In an embodiment, block 46 is configured to actively monitor tracked cases.

Figure 5:
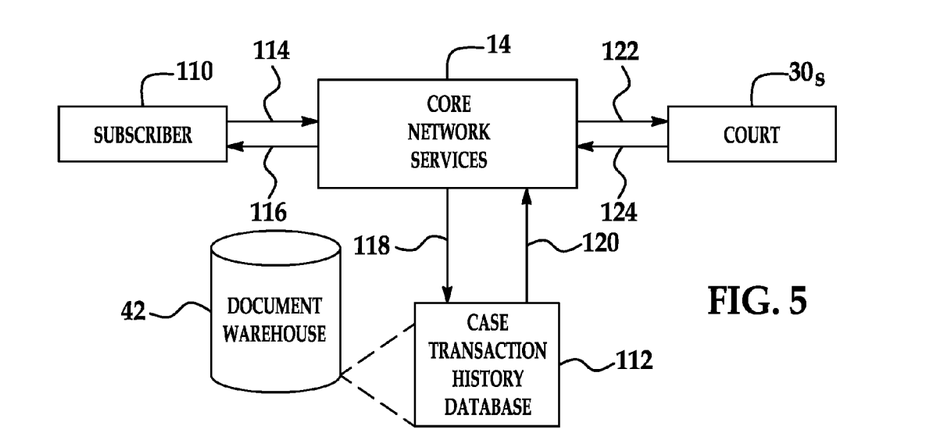
FIG. 5 is a diagrammatic and block diagram showing messaging activity to and from the plaintiff/court interface and reporting block of FIG. 1.

FIG. 5 is a simplified block diagram showing message flows to, from and between a subscriber 110, a selected court $30_S$ in which a case (e.g., a collection case) has been or will be filed, and the system 10. In FIG. 5, the subscriber is designated 110 and may be a plaintiff although it should be understood that the plaintiff is not necessarily the only entity interested in checking the status of a case. The selected court $30_S$ is the court selected by system 10 as the appropriate court in which to file the claim. Once a case has been filed, core network service applications block 14 provides an interface for a subscriber to check the status. For example only, FIG. 5 shows a status inquiry message 114 being sent by the subscriber 110 to the system 10, which is specifically referred to the core services block 14 for handling. The inquiry message 114 request a posting of the most recent activity on the case, for example. A reporting function contained within core services 14 (e.g., block 46) fulfils this inquiry message 114 by transmitting a reporting message 116 back to the subscriber, which contains the requested information.

The core services block 14 may be configured to fulfill the request message 114 as follows. First, the block 14 may be configured to send an inquiry message 118 to a history database 112, which may be a part of the electronic data and document warehouse 42. A response message 120 is returned (e.g., to the reporting block 46). Depending on the contents of the response message 120, the core services block 14 may either transmit the reporting message 116 to the subscriber, or take alternative action. As to the latter, the core services block 14 may determine that the returned information has not been updated recently enough, in which case an update inquiry message 122 may be sent to the selected court $30_S$ with the update information concerning recent case activity (if any) being returned in message 124. The core services block (e.g., via electronic data and document warehouse block 42) may be configured to update the history database 112 as well as transmit the reporting message 116 with up-to-date information. In alternative embodiments where court $30_S$ automatically sends out an update message when further activity occurs on the case, the core services block 14 may be configured to automatically log in to the court's system and obtain such updates, update the transaction database 112 and then, optionally, transmit a reporting message to predetermined subscribers.

In a further embodiment, the core services block 14 may be configured to automatically provide reporting messages 116. For example, in the scenario of an initially filed complaint, certain items of information are returned to the system 10, such as a filing acknowledgement, a case number for the newly-filed action (e.g., collection action), the name of the assigned judge, and the like. The core services block 14 (i.e., via plaintiff/Court interface and reporting block 46 and electronic data and document warehouse block 42) may be configured to store these items of information in the database 112, and, optionally, automatically prepare and send a reporting message 116 to the subscriber 110 (which in the scenario described, may be the plaintiff). It should be understood that a wide range of variations are possible as to the reporting of case activity/case status information.

Without loss of generality, the messaging concepts described and illustrated above in connection with FIG. 5 may be expanded to cover the methodology for facilitating communications between system subscribers and the court systems. In this regard, it should be understood that not only status requests, but the initial request to file a legal claim as well as to take advantage of the various value-added services will all involve messages (i.e., requests) to system 10 (e.g., a message requesting authoring of a legal document as per value added service application service 32, a message requesting electronic filing as per court efiling application service 34, a message requesting other collection/litigation applications such as skip tracing, as per application service 36, a message requesting some other type of court filing as per other court filing application service 38, a message requesting status, a message requesting execution of search for a particular pending collection law suit, etc.). While blocks 40, 44 described herein refer to settlement of court fees, the system 10 is configured, in certain embodiment, to charge a service fee to its subscribers for availing themselves of, for example, one or more of the value-added application services 32, 34, 36 and 38. The nature of the service fee may be on a transaction (or message) basis, may be on a subscription basis in accordance with the selected value added service 32, 34, 36 and 38 or in accordance with other use-based or subscription based model now know or hereafter developed.

Figure 6:
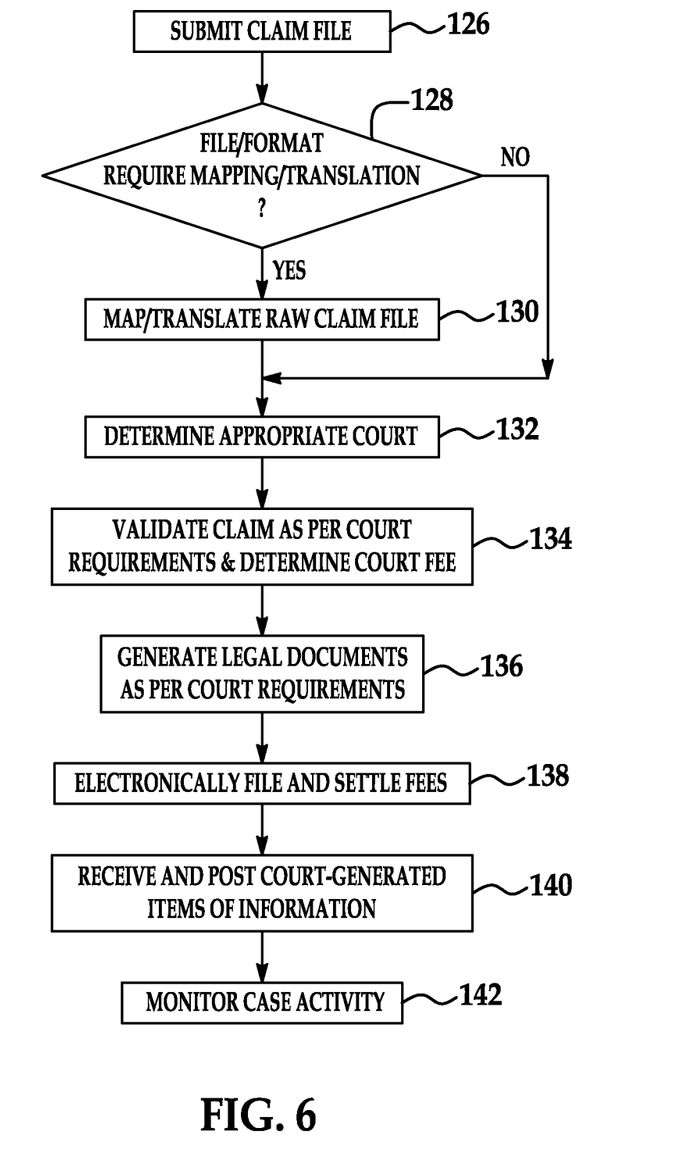
FIG. 6 is a flowchart showing a method of authoring and electronically filing legal documents.

FIG. 6 is a simplified flowchart showing a method of automatically authoring and electronically filing a legal document. The method begins in step 126.

In step 126, a plaintiff, via legal collections application 32, submits a claim file to system 10, either through the direct integration interface 50 or through the web portal interface 48, as described above. The claim file (best shown in exemplary fashion in FIG. 4) contains claim data sufficient to generate the needed court pleadings (e.g., party names, party addresses, debt type, account number, account balance, past payment information and perhaps supporting documentation). The method then proceeds to step 128.

In step 128, the system 10 (via a mapping module) determines whether the received claim file is of a file type and/or format that requires and/or would benefit from mapping. This step is most applicable for those data files obtained through the direct integration interface 50. In the scenario where the plaintiff submits the claim file via the web portal interface 48, the user interface portion of the web portal is preferably configured to solicit and capture claim data (and supporting documentation if needed) in a predetermined, desired format, so no mapping/translation is needed. If the answer in step 128 is "YES", then the method proceeds to step 130; otherwise, the method branches to step 132.

In step 130, the system 10 maps and/or translates party and/or claim data in the submitted claim file into the required and/or desired format, as described above. The method then proceeds to step 132.

In step 132, the legal collection application 32, in connection with the rules block 40, selects the appropriate court based on the data in the claim file, as well as predetermined business rules, as described above (i.e., a specially-configured computer that is configured to evaluate the claim data in light of predetermined business rules). In one embodiment, the rules block 40 evaluates (a) claim information (e.g., account information such as the account number, original creditor, principal balance, interest balance, payment information such as last payment date, debt type, etc.) and (b) party information (e.g., debtor name(s), plaintiff name, assignee name, etc.) to select the court (i.e., jurisdiction and specific court within the jurisdiction) in which the generated legal documents (e.g., to institute a legal action) will be filed. In this regard, the rules block 40 also makes use of predetermined court selection data and criteria. The method then proceeds to step 134.

In step 134, the legal collection application 32 (in connection with the rules block 40) validates the claim (i.e., the adequacy of a claim based on the claim data and supporting documentation) in accordance with the requirements of the state and selected court rules and accompanying documentation requirements. In this regard, the rules block 40 will validate the embedded business rules for the specific, selected court that the required supporting documentation has been submitted and that the information pertaining to both party and the claim is complete and adequate. To the extent that the application 32 cannot validate the submitted claim, the application 32 is configured to notify or otherwise communicate the validation failure to the plaintiff, preferably along with an identification of the specific inadequacies in the submitted claim. Otherwise, the legal collection application 32 may notify or confirm to the plaintiff that the claim has been validated. In addition, the system 10 (via rules block 40) determines the required lawsuit filing fee for the selected court. The method then proceeds to step 136.

In step 136, the legal collection application 32, in connection with rules block 40 and electronic data and document warehouse 42, generates the necessary legal documents that meet the format and other requirements of the selected court. The application 32 will populate selected forms with information drawn from the claim file, all as described above. In addition, the legal collection application 32 is configured to access necessary supporting documentation (e.g., contracts, credit applications, account statements, account summary information and legal notices) and add such documentation to a package for electronic filing. Note that to the extent that the destination court system uses an electronic standard that differs from the default "working" standard used by the system 10 (e.g., LegalXML), then the translation of data fields will be performed. The method then proceeds to step 138.

In step 138, the court e-filing application 34 electronically files the claim package (i.e. including the generated legal documents and any appended supporting documentation) with the selected, destination court, based on the claim receipt preferences of that court.

In addition, the court e-filing application 34, in connection with the payment engine 44, facilitates settlement of the required court filing fees, for example, through any one of multiple electronic settlement approaches, as described above. The method then proceeds to step 140.

In step 140, the court e-filing application 34 receives items of information from the destination court as a result of the electronic delivery of the filing package in step 138. For example, such items of information may include a filing acknowledgement, a case number and an identification of an assigned judge. The items of information, via the plaintiff/court interface and reporting block 46, are stored in a case history database (best shown in FIG. 5). The items of information may also include information received at subsequent times (e.g., service of process information). The block 46 is configured to make such case-related information available to certain subscribers of the system 10, as described above in connection with FIG. 5. The feature provides timely visibility into claim status. On a more global basis, the system 10 may, in an embodiment, be configured to maintain a history of all submitted/filed claims and the required case identifications (ID's) to ensure status tracking and communication back to the respective parties. To elaborate, all filed cases (and all corresponding documents associated with each case) may be maintained in a case history database (e.g., case history database 112 in FIG. 5) for subsequent search, access and retrieval by subscribers. For example, system 10 is configured to provide an interface for subscribers to enter search criteria (e.g., case identification, such as a case number or an account number referred to in a case) to identify and return matching records stored in the history database. It should be further understood that subscriber access controls will further limit what records are returned to the subscriber (i.e., even if a matching record is stored in the history database, the system 10 is configured to return only those for which the subscriber has access as per pre-established permissions). The method then proceeds to step 142.

In step 142, the system 10 automatically monitors each filed case (i.e., submitted claim) for new activity. In this regard, the system 10, through one of interfaces 52, 54, is configured to communicate with court systems for at least the purpose of obtaining any updates or activity on the filed claims/cases, as described above.

In sum, the system and method of the present invention transforms claim data incorporated in a claim file into corresponding electronic legal documents suitable for direct electronic filing with the destination court. It should be understood that system 10 is not limited to supporting and facilitating only debt collection actions. For example, block 38 is configured to support and facilitate other contemplated judicial causes of action, such as probate or bankruptcy filings. In addition, the functions described above performed by the computer-implemented system 10 may be realized as computer program code or code sections and further embodied in a computer readable storage medium. Such articles of manufacture formed by storage of such code or code sections on computer-readable storage media achieves the same advantages as the systems and methods described above.

It should be understood that the system 10 (and the methods performed thereby) as described above may include conventional processing apparatus known in the art, capable of executing pre-programmed instructions stored in an associated memory, all performing in accordance with the functionality described herein. It is contemplated that the methods described herein will be programmed in a preferred embodiment, with the resulting software being stored in an associated memory and may also constitute the particular means for performing such methods or functions thereof. In particular, at least the various blocks 32, 34, 36, 38 within the value-added service applications 12, the blocks 40, 42, 44 and 46 within the core network service applications 14 and the direction integration interfaces 50, 54 and the web portal interfaces 48, 52 may respectively constitute the means for performing the functions described in connection with each. Implementation of the invention, in software, in view of the foregoing enabling description, would require no more than routine application of programming skills by one of ordinary skill in the art. Such a system may further be of the type having both ROM, RAM, a combination of non-volatile and volatile (modifiable) memory so that the software can be stored and yet allow storage and processing of dynamically produced data and/or signals.

Although numerous embodiments of this invention have been described above with a certain degree of particularity, those skilled in the art could make numerous alterations to the disclosed embodiments without departing from the spirit or scope of this invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A method for receiving and processing a claim file and authoring and electronically filing a legal document for a legal action in a court, comprising the steps of:
   (A) electronically receiving the claim file in electronic form wherein the claim file includes a plurality of data fields in a native format;
   (B) mapping, using an electronic processor, one or more of the data fields from the native format to a desired format different from the native format to form a modified claim file;
   (C) selecting a court, using the processor, at least in part on data included in the modified claim file and predetermined court selection criteria;
   (D) generating, using the processor, a legal document in electronic form configured for electronic filing in the selected court and which is compliant with requirements of the selected court, using data in the modified claim file and predetermined filing requirements data associated with the selected court; and
   (E) electronically filing the generated legal document in the selected court.

2. The method of claim 1 wherein said step of receiving a claim file includes the sub-steps of:
   presenting a user interface configured to solicit claim data from a user;
   capturing the claim data through the user interface; and
   storing the claim data in the claim file.

3. The method of claim 1 wherein said step of receiving a claim file includes the sub-step of:
   configuring a direct interface to receive claim data from a remote system; and
   storing claim data in the claim file.

4. The method of claim 1 further including the step of:
   establishing the claim file so as to include a first plurality of fields corresponding to party information and a second plurality of fields corresponding to claim information, said party information including at least one from the group comprising a plaintiff name, a plaintiff address, a defendant/debtor name, a defendant/debtor address, assignee name and assignee address and wherein said claim information includes at least one from the group comprising a creditor name, a creditor address, a debt type, an account type, an account identification number, a principal balance, an interest balance, payment history information and a last payment date.

5. The method of claim 4 further including the step of:
   associating with the claim file one or more supporting documents selected from the group comprising a contract, a credit application, an account statement, an account summary and a legal notice.

6. The method of claim 1 further including the step of:
   validating a legal claim based on at least on data in the modified claim file and predetermined rules and documentation requirements associated with the selected court.

7. The method of claim 1 wherein said step of selecting a court includes the sub-steps of:
   defining selection rules for selection of a court; and identifying the selected court from a list of candidate courts using the selection rules and data included in the modified claim file.

8. The method of claim 1 wherein said step of generating a legal document includes the sub-steps of:
   retrieving predetermined document requirements associated with the selected court; and
   producing the legal document using at least the data in the modified claim file and the retrieved document requirements.

9. The method of claim 8 wherein said sub-step of producing the legal document includes the sub-step of producing the legal document in accordance with a LegalXML standard.

10. The method of claim 1 further including the step of:
    determining a fee for the selected court for electronically filing the generated legal document; and
    facilitating settlement of the determined filing fee by a filer of the legal document.

11. The method of claim 1 further including the step of:
    receiving at least one item of information from the selected court as a result of the filing of the generated legal document; and
    storing the received item of information.

12. The method of claim 11 wherein the at least one item of information is selected from the group comprising a filing acknowledgement, a case identification number, an identification of an assigned judge and a hearing date, and wherein said method further includes the step of:
    posting the at least one item of information for availability to an authenticated user.

13. The method of claim 1 wherein the generated legal document initiates or is associated with a case before the selected court, said method further including the step of:
    monitoring the status of the case and posting a further item of information.

14. The method of claim 1 further comprising the step of:
    selecting the legal action from the group comprising a collection action, a bankruptcy action and a probate action.

15. A system for receiving and processing a claim file and authoring and electronically filing a legal document for a legal action in a court, comprising:
    an interface configured to electronically receive the claim file in electronic form wherein the claim file includes a plurality of data fields in a native format;
    a mapping module configured to be executed on an electronic processor, said mapping module being configured to map one or more of the fields of the claim file from the native format to a desired format different from the native format to form a modified claim file;
    a rules block configured to be executed on the processor and further configured to select a court based on data included in the modified claim file and predetermined court selection criteria;
    a legal document authoring block configured to be executed on the processor and configured to produce a legal document in electronic form configured for electronic filing in the selected court using the modified claim file and predetermined filing requirements data associated with the selected court; and
    a court filing block configured to be executed on the processor and configured to electronically file the generated legal document in the selected court.

16. The system of claim 15 further comprising:
    means for validating a legal claim based on at least the modified claim file and predetermined rules and documentation requirements associated with the selected court.

17. The system of claim 15 wherein said legal document authoring block is further configured to produce the legal document in accordance with a LegalXML standard.

18. The system of claim 15 further comprising:
    means for settling a fee for the selected court for electronically filing the legal document.

19. The system of claim 15 wherein the generated legal document initiates or is associated with a case before the selected court, further comprising:
    means for retrieving transactions associated with the case.

20. A method for receiving and processing one or more claim files and authoring and electronically filing legal documents associated with legal actions, comprising the steps of:
    (A) electronically receiving at a system interface a first claim file in electronic form from a first entity wherein the first claim file includes a first source data element having a first format;
    (B) electronically receiving at the system interface a second claim file in electronic form from a second entity different from the first entity, wherein the second claim file includes a second source data element having a second format different from the first format;
    (C) mapping, using a processor, the first and second source data elements into first and second destination data elements conforming to a desired format to form first and second modified claim files;
    (D) selecting, using the processor, first and second courts, based respectively on data included in the first and second modified claim files and predetermined court selection criteria;
    (E) generating, using the processor, at least first and second legal documents in electronic form, respectively configured for electronic filing in the first and second courts and which are compliant with requirements of the first and second courts, said generating step using the first and second modified claim files and predetermined requirement data associated with the first and second courts; and
    (F) electronically filing the first and second legal documents respectively in the first and second courts to thereby institute legal actions in each court.

21. The method of claim 20 further including the step of obtaining a third claim file that includes the sub-steps of:
    presenting a user interface configured to solicit claim data from a user;
    capturing the claim data through the user interface; and
    storing the claim data in the third claim file.

22. The method of claim 20 further including the step of:
    establishing the first claim file so as to include a first plurality of fields corresponding to the first party information portion and a second plurality of fields corresponding to the first claim information portion, said first party information including at least one from the group comprising a plaintiff name, a plaintiff address, a defendant/debtor name, a defendant/debtor address, assignee name and assignee address and wherein said first claim information portion includes at least one from the group comprising a creditor name, a creditor address, a debt type, an account type, an account identification number, a principal balance, an interest balance, payment history information and a last payment date.

23. The method of claim 22 further including the step of:
associating with the first claim file one or more supporting documents selected from the group comprising a contract, a credit application, an account statement, an account summary and a legal notice.

24. The method of claim 20 further including the step of:
validating a legal claim based on data included in the first modified claim file and predetermined rules and documentation requirements associated with the selected first court.

25. The method of claim 20 wherein said step of selecting a first court includes the sub-steps of:
defining selection rules for selection of the first court; and
identifying the selected first court from a list of a plurality of candidate courts using the selection rules and data included in the first claim file.

26. The method of claim 20 wherein said step of generating a first legal document includes the sub-steps of:
retrieving predetermined document requirements associated with the selected first court; and
producing the first legal document using at least the first claim file and the retrieved document requirements.

27. The method of claim 20 wherein the generated first legal document initiates or is associated with a case before the selected first court, said method further including the step of:
monitoring the status of the case and posting a further item of information.

28. The method of claim 20 further comprising the step of:
selecting the legal action from the group comprising a collection action, a bankruptcy action and a probate action.

\* \* \* \* \*